United States Patent
Schmidt et al.

(10) Patent No.: US 10,472,076 B2
(45) Date of Patent: Nov. 12, 2019

(54) RELEASE SYSTEM FOR EVACUATION SLIDE ASSEMBLY

(71) Applicant: GOODRICH CORPORATION, Charlotte, NC (US)

(72) Inventors: Ryan Schmidt, Gilbert, AZ (US); Helperus Ritzema Rautenbach, Colorado Springs, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 457 days.

(21) Appl. No.: 15/262,944

(22) Filed: Sep. 12, 2016

(65) Prior Publication Data

US 2018/0072426 A1   Mar. 15, 2018

(51) Int. Cl.
*B64D 25/14*   (2006.01)

(52) U.S. Cl.
CPC .................... *B64D 25/14* (2013.01)

(58) Field of Classification Search
CPC .................. B64D 25/14; A62B 1/20
See application file for complete search history.

(56) References Cited

U.S. PATENT DOCUMENTS

| | | | |
|---|---|---|---|
| 5,102,070 A | 4/1992 | Smialowicz et al. | |
| 5,180,121 A | 1/1993 | Banks et al. | |
| 6,685,139 B2 | 2/2004 | Blum et al. | |
| 6,786,454 B2 | 9/2004 | Baderspach et al. | |
| 7,380,755 B2 | 6/2008 | Matsch | |
| 7,490,795 B2 | 2/2009 | Clegg et al. | |
| 8,919,699 B2 | 12/2014 | Kress et al. | |
| 9,242,737 B2 | 1/2016 | Islam et al. | |
| 2006/0266888 A1 | 11/2006 | Matsch | |
| 2007/0023578 A1 | 2/2007 | Myers | |
| 2016/0083071 A1 | 3/2016 | Pichlmaier et al. | |
| 2018/0210483 A1 | 7/2018 | Santiago | |

FOREIGN PATENT DOCUMENTS

| | | | |
|---|---|---|---|
| EP | 1911674 | 4/2008 | |
| EP | 1911674 A2 * | 4/2008 | ............. B64D 25/14 |
| EP | 3085624 | 10/2016 | |
| EP | 3085624 A2 * | 10/2016 | ............. F15B 15/14 |

OTHER PUBLICATIONS

European Patent Office, European Search Report dated Jan. 24, 2018 in Application No. 17190355.2-1010.

* cited by examiner

*Primary Examiner* — Valentina Xavier
(74) *Attorney, Agent, or Firm* — Snell & Wilmer L.L.P.

(57) ABSTRACT

A release system for an evacuation slide assembly of an aircraft includes a fluid delivery manifold, a first actuator, and a second actuator. In various embodiments, a fluid is configured to flow into and pressurize the fluid delivery manifold from a fluid source in response to an evacuation event. In various embodiments, the first actuator is fluidly coupled to the fluid delivery manifold, wherein the first actuator is configured to release a blowout panel of the evacuation slide assembly in response to the fluid pressurizing the fluid delivery manifold. In various embodiments, the second actuator is fluidly coupled to the fluid delivery manifold, wherein the second actuator is configured to release a soft cover of the evacuation slide assembly in response to the fluid pressurizing the fluid delivery manifold.

15 Claims, 4 Drawing Sheets

RELEASE SYSTEM FOR EVACUATION SLIDE ASSEMBLY

FIELD

The present disclosure relates to aircraft evacuation assemblies for aircraft, and, more specifically, to release systems for evacuation slides.

BACKGROUND

An evacuation slide assembly may include an inflatable slide that helps passengers disembark from an aircraft in the event of an emergency or other evacuation event. Conventionally, deployment of the inflatable slide generally includes multiple release assemblies configured to facilitate the release of the inflatable slide from its stored position on the aircraft. For example, inflatable slides may be generally stored within a soft cover that is disposed within a container, such as a packboard.

SUMMARY

In various embodiments, a release system for an evacuation slide assembly of an aircraft is disclosed herein. The release system may include a blowout panel and a soft cover that are configured to be in operable communication with a power source. The blowout panel and the soft cover may be configured to be deployed by the power source in response to an evacuation event. In various embodiments, the release system may further include an evacuation slide that is in configured to be in operable communication with the power source, wherein the evacuation slide is configured to be deployed by the power source in response to the evacuation event.

The release system may include a fluid delivery manifold, a first actuator, and a second actuator. In various embodiments, the power source is a fluid source and a fluid is configured to flow into and pressurize the fluid delivery manifold from the fluid source in response to the evacuation event. In various embodiments, the first actuator is fluidly coupled to the fluid delivery manifold, wherein the first actuator is configured to release the blowout panel of the evacuation slide assembly in response to the fluid pressurizing the fluid delivery manifold. In various embodiments, the second actuator is fluidly coupled to the fluid delivery manifold, wherein the second actuator is configured to release the soft cover of the evacuation slide assembly in response to the fluid pressurizing the fluid delivery manifold.

According to various embodiments, the fluid source may be a charged tank configured to inflate the evacuation slide in response to the evacuation event. The first actuator and the second actuator may be non-electrically actuated, according to various embodiments. For example, the fluid delivery manifold may include a valve for controlling flow of the fluid from the fluid source, wherein the valve is non-electrically actuated.

In various embodiments, the first actuator and the second actuator may be pneumatic actuators. For example, the first actuator may be a pneumatic ball lock and/or the second actuator may be a pneumatic piston actuator. In various embodiments, in a locked state the first actuator is configured to secure the blowout panel and in response to the fluid pressurizing the fluid delivery manifold, the first actuator may be configured to transition to an unlocked state to release the blowout panel. In various embodiments, in a locked state the second actuator is configured to retain an evacuation slide enclosed within the soft cover and in response to the fluid pressurizing the fluid delivery manifold, the second actuator is configured to transition to an unlocked state to allow release of the evacuation slide from enclosure within the soft cover. The second actuator may be configured to release a key-loop of a lacing to allow the lacing to unfurl.

In various embodiments, an evacuation slide assembly of an aircraft is disclosed herein. The evacuation slide assembly includes, according to various embodiments, an evacuation slide mounted to the aircraft, a charged tank fluidly coupled to the evacuation slide, a blowout panel for retaining the evacuation slide, a first actuator, a soft cover, and a second actuator. In various embodiments, fluid is configured to flow from the charged tank to the evacuation slide in response to an evacuation event. Also, in various embodiments, the blowout panel is for retaining the evacuation slide and the first actuator is fluidly coupled to the charged tank, wherein the first actuator is configured to release the blowout panel in response to the fluid flowing from the charged tank to the first actuator. In various embodiments, the soft cover is for retaining the evacuation slide, wherein the second actuator is fluidly coupled to the charged tank, wherein the second actuator is configured to release the soft cover in response to the fluid flowing from the charged tank to the second actuator.

In various embodiments, the evacuation slide assembly further includes a packboard mounted to the aircraft, wherein the packboard comprises a packboard compartment. In various embodiments, the evacuation slide is mounted to the packboard. The blowout panel may extend across an opening of the packboard compartment and the first actuator may, in a locked state, secure the blowout panel relative to the packboard to retain the evacuation slide within the packboard compartment. In various embodiments, the soft cover may be disposed within the packboard compartment and the soft cover may include lacing. The second actuator, in a locked state, may retain the evacuation slide within the soft cover.

In various embodiments, the evacuation slide assembly may further include a valve for controlling flow of the fluid from the charged tank, wherein the valve is non-electrically actuated. In various embodiments, the first actuator and the second actuator are non-electrically actuated.

Also disclosed herein, according to various embodiments, is a method of deploying an evacuation slide of an aircraft. The method may include flowing fluid from a fluid source to the evacuation slide, actuating a first actuator in fluid communication with the fluid to release a blowout panel, and actuating a second actuator in fluid communication with the fluid to release a soft cover. In various embodiments, the flowing the fluid from the fluid source to the evacuation slide, the actuating the first actuator, and the actuating the second actuator occur substantially simultaneously in response to an evacuation event. In various embodiments, the flowing the fluid from the fluid source to the evacuation slide, the actuating the first actuator, and the actuating the second actuator occur non-electronically.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
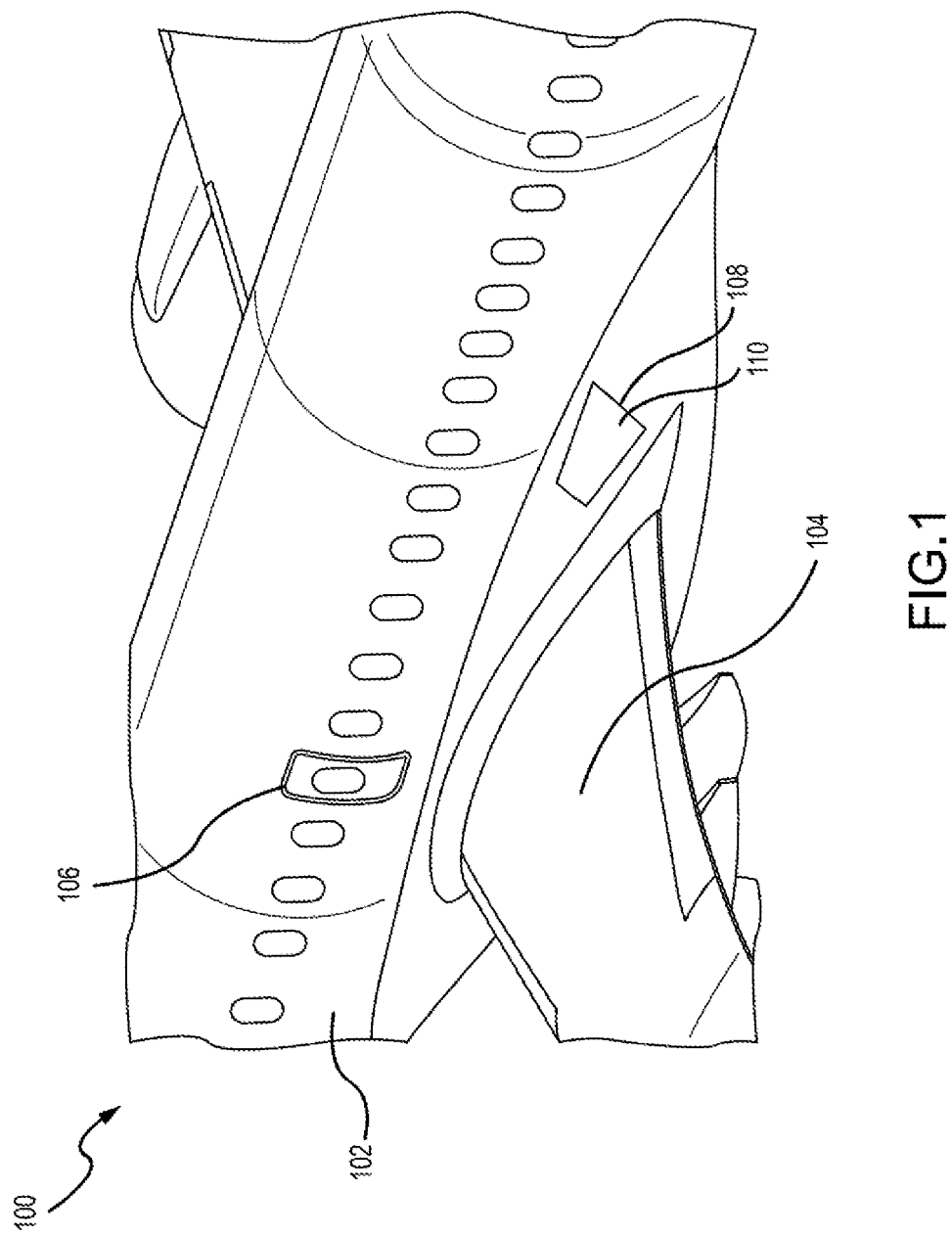
FIG. 1 illustrates a perspective view of an evacuation slide assembly of an aircraft, in accordance with various embodiments.

Referring to FIG. 1, an exemplary aircraft 100 is shown, in accordance with various embodiments. Aircraft 100 may comprise a fuselage 102 with wings 104 fixed to fuselage 102. Emergency exit door 106 may be disposed on fuselage over wing 104 such that passengers exiting emergency exit door 106 would exit onto wing 104. An evacuation slide assembly 108 may be disposed aft of emergency exit door 106. Blowout panel 110 may cover evacuation slide assembly 108 when installed on the aircraft 100. In various embodiments, the evacuation slide assembly 108 may include and/or be housed within a packboard mounted to the aircraft 100.

The evacuation slide assembly 108 may jettison the blowout panel 110 and deploy an evacuation slide 122 (FIG. 3), such as an inflatable slide, in response to emergency exit door 106 opening or in response to another evacuation event. The evacuation slide 122 may be packed within and otherwise stored and/or retained within a soft cover 120 (FIG. 3). As described in greater detail below, the evacuation slide assembly 108 may include a release system 101 (FIG. 2) that facilitates the deployment of the evacuation slide 122 and the release of both the blowout panel 110 and the soft cover 120. In various embodiments, as described in greater detail below, the release system 101 may be actuated using a single power source, such as a charged tank of fluid. In various embodiments, actuation of the release system 101, and thus deployment of the evacuation slide 122 and the deployment/release of both the blowout panel 110 and the soft cover 120, may be non-electrically actuated.

Figure 2:
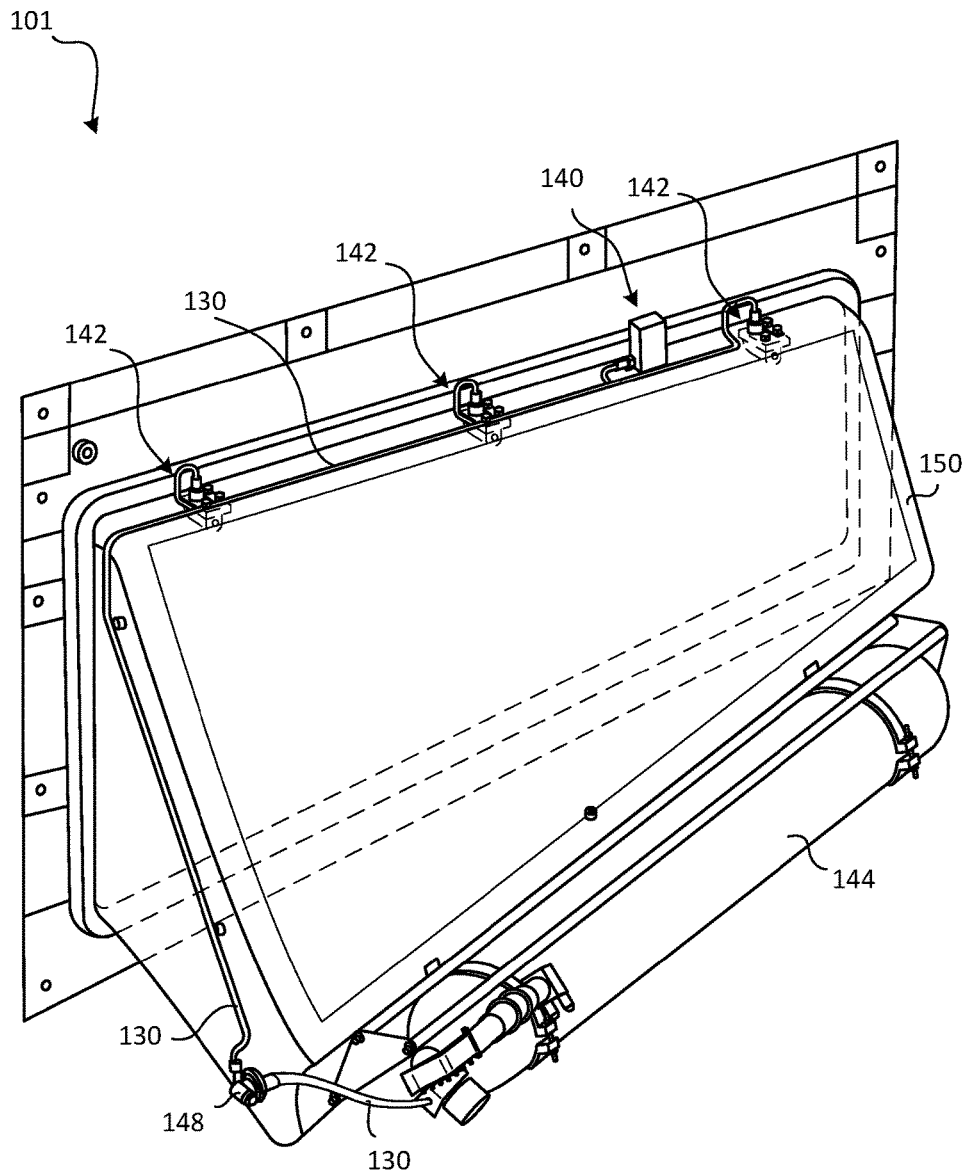
FIG. 2 illustrates a perspective view of a release system of an evacuation slide assembly of an aircraft, in accordance with various embodiments.
Figure 3:
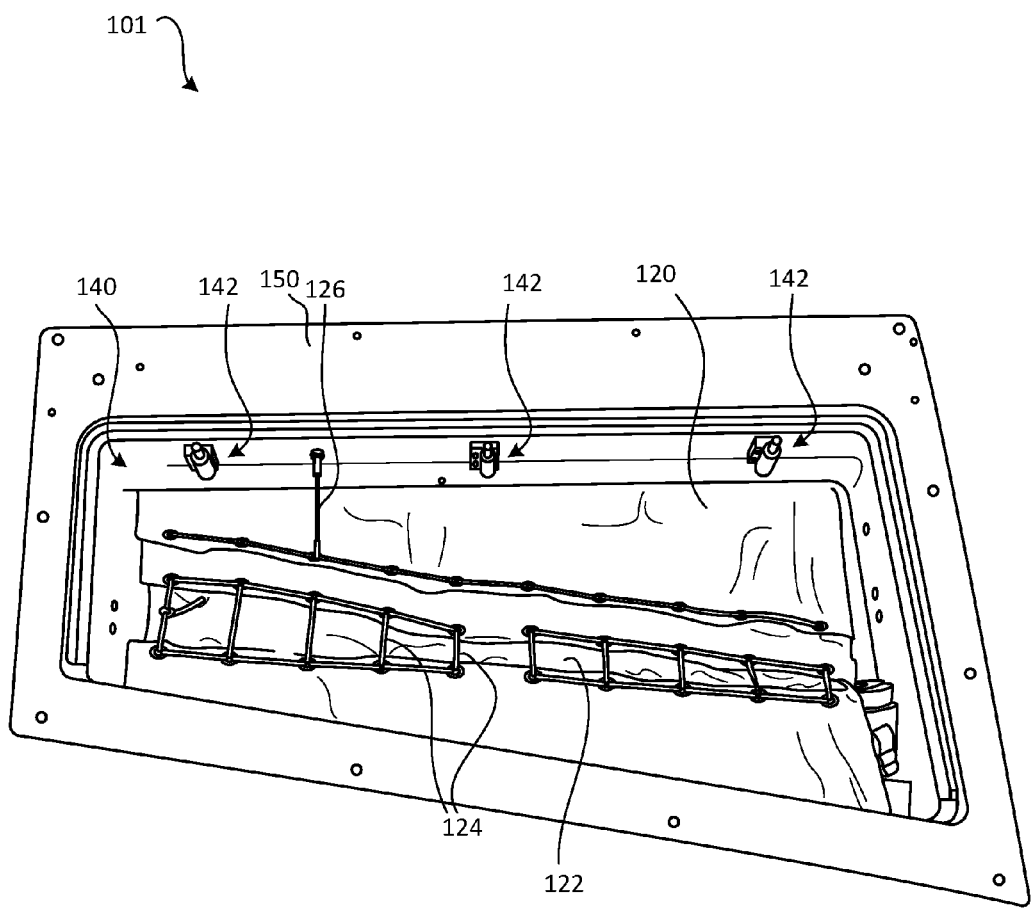
FIG. 3 illustrates a perspective view of a release system of an evacuation slide assembly of an aircraft, in accordance with various embodiments.

With reference to FIG. 2, the release system 101 of the evacuation slide assembly 108 is shown, as viewed from an inboard perspective, in accordance with various embodiments. The evacuation slide assembly 108 may include and/or may be housed within a packboard 150. The release system 101 may include a fluid delivery manifold 130. The fluid delivery manifold 130 may be capable of being fluidly coupled or fluidly coupled to a fluid source, such as a charged tank 144 of fluid. In various embodiments, the charged tank 144 may contain a compressed fluid. For example, the charged tank 144 may be a pneumatic gas cylinder and flow of the compressed fluid from the charged tank 144 may actuate the release system 101. In various embodiments, the fluid delivery manifold 130 may route fluid from the charged tank 144 to the evacuation slide to inflate the slide in response to an evacuation event.

The fluid delivery manifold 130 may include piping and/or tubes through which the fluid from charged tank 144 flows. The release system 101 may include a first and a second actuator fluidly coupled to the fluid delivery manifold 130. The first actuator 142 is configured to release the blowout panel 110 of the evacuation slide assembly 108 in response to the fluid flowing into and pressurizing the fluid delivery manifold 130. That is, according to various embodiments, the blowout panel 110 may be at least partially retained in place by the first actuator 142 until an evacuation event and/or until fluid pressurizes the fluid delivery manifold 130. In response to the evacuation event and/or fluid pressurizing the fluid delivery manifold 130 (e.g., fluid flowing into the first actuator 142), the first actuator 142 may release the blowout panel 110, thus allowing the blowout panel 110 to be jettisoned, in accordance with various embodiments. In various embodiments, the act of jettisoning of the blowout panel 110 may be accomplished indirectly via inflation of the evacuation slide.

In various embodiments, the first actuator 142 may include multiple actuators spaced apart from each other and distributed along a length of the packboard 150. In various embodiments, the first actuator or first actuators 142 may be ball locks. The ball locks may engage a lip or other surface of the blowout panel 110 and thus may securely retain, or at least facilitate retaining, the blowout panel 110 in place over an opening to the packboard compartment. In response to fluid flowing through the delivery manifold 130, the pressurized fluid may motivate the first actuator or first actuators 142 to release the blowout panel 110.

The second actuator 140, according to various embodiments, is fluidly coupled to the fluid delivery manifold 130 and may be configured to release the soft cover 120 of the evacuation slide assembly 108 in response to the evacuation event and/or in response to fluid flowing through the fluid delivery manifold 130. Additional details pertaining to the second actuator 140 are included below with reference to FIG. 3.

The charged tank 144 may be mounted to the back of the packboard 150. The charged tank 144, as mentioned above, may provide pressurized gas to inflate the evacuation slide 122 and to motivate both the first actuator 142 and the second actuator 140. The fluid delivery manifold 130 may include and/or be fluidly coupled to a valve 148. The valve 148 may control flow of fluid from the charged tank 144 to the evacuation slide 122 and the actuators 142, 140, in accordance with various embodiments. In various embodiments, as mentioned above, the release system 101 may be non-electrically actuated. Thus, according to various embodiments, valve 148 may be, for example, mechanically actuated in response to the emergency exit door 106 opening and/or in response to an evacuation event. In various embodiments, the release system 101 may be actuated without electricity and/or without an electrical power source.

In various embodiments, the pressure of the fluid may be greater than about 300 pounds per square inch (psi) (2,070 kilopascal). In various embodiments, the pressure of the fluid may be between about 300 psi (2,070 kilopascal) and about 500 psi (3,450 kilopascal). In various embodiments, the pressure of the fluid may be about 360 psi (2,480 kilopascal). In various embodiments, the pressure of the fluid may be about 450 psi (3,100 kilopascal).

With reference to FIG. 3, the evacuation slide assembly 108 may comprise soft cover 120 containing evacuation slide 122. Soft cover 120 may have lacing 124 to enclose soft cover 120 and to retain the evacuation slide 122. Lacing 124 may be in a daisy chain or speed lacing configuration. The lacing 124 may have a key-loop that, once released or unlocked, allows the remainder of the lacing 124 to be unfurled. Thus, in response to releasing the key-loop, the evacuation slide 122 may be released (or may at least be releasable).

In various embodiments, the second actuator 140 may be coupled to the lacing 124 and motivation of the second actuator 140, in response to pressurization of the fluid delivery manifold 130, may unlock the key-loop or other such feature of the lacing 124, thereby allowing the lacing 124 to be unfurled. In various embodiments, the lacing 124 may include a pin that locks the key-loop. The pin may be slidably coupled to the lacing 124 and may be coupled to the second actuator 140. Movement of the second actuator 140 may cause the pin to move, thus unlocking the lacing 124. In various embodiments, the second actuator 140 may be a pneumatically drivable piston actuator.

The second actuator 140 may have a housing that has an inlet for receiving pressurized fluid from the charged tank 144. The second actuator 140 may also include an arm that is configured to couple to the key-loop or pin of the lacing 124. The arm of the second actuator 140 may be in an extended position when the pressure in the fluid delivery manifold 130 is below a threshold. Upon pressurization of the fluid delivery manifold 130 from the charged tank 144, the arm of the second actuator 140 may retract into the housing 170, thus sliding the pin or otherwise unlocking the key-loop of the lacing 124 to allow the lacing 124 to unfurl and release the evacuation slide 122 from the soft cover 120.

Figure 4:
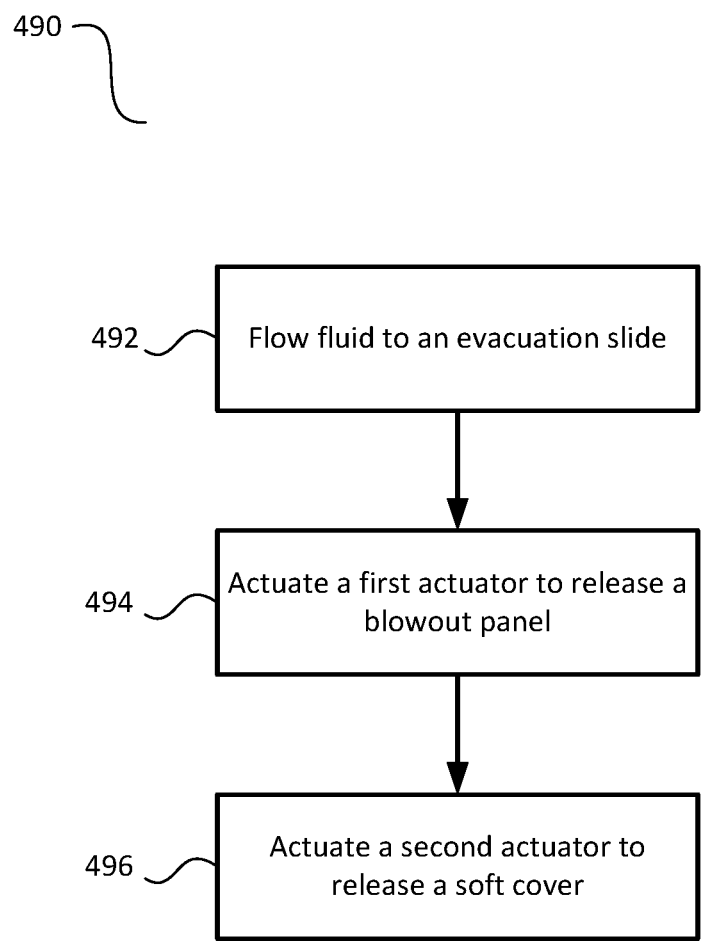
FIG. 4 illustrates a schematic flow chart diagram of a method of deploying an evacuation slide of an aircraft, in accordance with various embodiments.

FIG. 4 illustrates a schematic flow chart diagram of a method 490 of deploying an evacuation slide of an aircraft, in accordance with various embodiments. The method 490 may include flowing fluid from a fluid source, such as the charged tank 144, to the evacuation slide via the fluid delivery manifold 130 at step 492. The method 490 may further include actuating a first actuator in fluid communication with the fluid to release a blowout panel at step 494 and actuating a second actuator in fluid communication with the fluid to release a soft cover at step 496.

In various embodiments, flowing the fluid from the fluid source to the evacuation slide (step 492), actuating the first actuator (step 494), and actuating the second actuator (step 496) may occur substantially simultaneously in response to an evacuation event. In various embodiments, flowing the fluid from the fluid source to the evacuation slide (step 492), actuating the first actuator (step 494), and actuating the second actuator (step 496) may occur non-electronically.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A release system for an evacuation slide assembly of an aircraft, the release system comprising:
   a blowout panel;
   a soft cover;
   wherein both the blowout panel and the soft cover are configured to be deployed by a power source in response to an evacuation event, the power source also being configured to deploy an evacuation slide, the release system further comprising:
   a fluid delivery manifold, wherein the power source is a fluid power source and a fluid is configured to flow into and pressurize the fluid delivery manifold from the fluid power source in response to the evacuation event;
   a first actuator fluidly coupled to the fluid delivery manifold, wherein the first actuator is configured to deploy the blowout panel in response to the fluid pressurizing the fluid delivery manifold; and
   a second actuator fluidly coupled to the fluid delivery manifold, wherein the second actuator is configured to deploy the soft cover in response to the fluid pressurizing the fluid delivery manifold;
   wherein the first actuator and the second actuator are non-electrically actuated.

2. The release system of claim 1, further comprising the evacuation slide that is configured to be in operable communication with the power source, wherein the evacuation slide is configured to be deployed by the power source in response to the evacuation event.

3. The release system of claim 1, wherein the first actuator and the second actuator are pneumatic actuators.

4. The release system of claim 1, wherein the first actuator comprises a pneumatic ball lock.

5. The release system of claim 1, wherein the second actuator comprises a pneumatic piston actuator.

6. The release system of claim 1, wherein:
   in a locked state the first actuator is configured to secure the blowout panel; and
   in response to the fluid pressurizing the fluid delivery manifold, the first actuator is configured to transition to an unlocked state to release the blowout panel.

7. The release system of claim 1, wherein:
   in a locked state the second actuator is configured to retain an evacuation slide enclosed within the soft cover; and
   in response to the fluid pressurizing the fluid delivery manifold, the second actuator is configured to transition to an unlocked state to allow release of the evacuation slide from enclosure within the soft cover.

8. The release system of claim 1, wherein the second actuator is configured to release a key-loop of a lacing to allow the lacing to unfurl.

9. An evacuation slide assembly of an aircraft, the evacuation slide assembly comprising:
   an evacuation slide mounted to the aircraft;
   a charged tank fluidly coupled to the evacuation slide, wherein fluid is configured to flow from the charged tank to the evacuation slide in response to an evacuation event;
   a blowout panel for retaining the evacuation slide;
   a first actuator fluidly coupled to the charged tank, wherein the first actuator is configured to release the blowout panel in response to the fluid flowing from the charged tank to the first actuator;
   a soft cover for retaining the evacuation slide;
   a second actuator fluidly coupled to the charged tank, wherein the second actuator is configured to release the soft cover in response to the fluid flowing from the charged tank to the second actuator;
   wherein the first actuator and the second actuator are pneumatic actuators.

10. The evacuation slide assembly of claim 9, further comprising a packboard mounted to the aircraft, wherein the packboard comprises a packboard compartment.

11. The evacuation slide assembly of claim 10, wherein the evacuation slide is mounted to the packboard.

12. The evacuation slide assembly of claim 11, wherein the blowout panel extends across an opening of the packboard compartment, wherein the first actuator, in a locked state, secures the blowout panel relative to the packboard to retain the evacuation slide within the packboard compartment.

13. The evacuation slide assembly of claim 12, wherein the soft cover is disposed within the packboard compartment and comprises lacing, wherein the second actuator, in a locked state, retains the evacuation slide within the soft cover.

14. The evacuation slide assembly of claim 10, further comprising a valve for controlling flow of the fluid from the charged tank, wherein the valve is non-electrically actuated.

15. The evacuation slide assembly of claim 9, wherein the first actuator and the second actuator are non-electrically actuated.

* * * * *